US008775574B2

(12) United States Patent
DeHaan et al.

(10) Patent No.: US 8,775,574 B2
(45) Date of Patent: Jul. 8, 2014

(54) REMOTE NETWORK MANAGEMENT HAVING MULTI-NODE AWARENESS

(75) Inventors: Michael Paul DeHaan, Morrisville, NC (US); Adrian Likins, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 290 days.

(21) Appl. No.: 12/324,781

(22) Filed: Nov. 26, 2008

(65) Prior Publication Data

US 2010/0131625 A1 May 27, 2010

(51) Int. Cl.
*G06F 15/177* (2006.01)

(52) U.S. Cl.
USPC ............ 709/220; 709/221; 709/223; 707/200

(58) Field of Classification Search
USPC ...................... 709/220, 221, 223; 707/200
See application file for complete search history.

(56) References Cited

U.S. PATENT DOCUMENTS

| | | | |
|---|---|---|---|
| 6,154,128 A | 11/2000 | Wookey et al. | |
| 6,263,455 B1 | 7/2001 | Bannister | |
| 6,327,677 B1 | 12/2001 | Garg et al. | |
| 6,529,784 B1 | 3/2003 | Cantos et al. | |
| 6,611,869 B1 | 8/2003 | Eschelbeck et al. | |
| 6,636,521 B1 | 10/2003 | Giulianelli | |
| 6,721,880 B1 * | 4/2004 | Pike ................................ | 713/1 |
| 6,915,457 B1 | 7/2005 | Miller | |
| RE39,717 E | 7/2007 | Yates et al. | |
| 7,373,553 B2 | 5/2008 | Tripp et al. | |
| 7,441,021 B1 | 10/2008 | Perry | |
| 7,660,824 B2 * | 2/2010 | Halpern et al. ................... | 713/1 |
| 7,693,966 B2 | 4/2010 | Schmid | |
| 7,769,990 B1 * | 8/2010 | Okcu et al. ........................ | 713/1 |
| 7,856,496 B2 | 12/2010 | Kline | |
| 7,865,578 B1 * | 1/2011 | Gerraty .......................... | 709/220 |
| 2002/0184349 A1 | 12/2002 | Manukyan | |
| 2003/0055931 A1 | 3/2003 | Cravo De Almeida et al. | |
| 2003/0061323 A1 * | 3/2003 | East et al. ...................... | 709/223 |
| 2003/0120754 A1 | 6/2003 | Muto et al. | |
| 2003/0177412 A1 | 9/2003 | Todd | |
| 2003/0208589 A1 | 11/2003 | Yamamoto | |
| 2004/0006546 A1 | 1/2004 | Wedlake et al. | |
| 2004/0032625 A1 * | 2/2004 | Yamano ........................ | 358/405 |
| 2004/0034577 A1 | 2/2004 | Van Hoose et al. | |
| 2004/0198319 A1 | 10/2004 | Whelan et al. | |
| 2004/0230828 A1 | 11/2004 | DeFuria et al. | |
| 2005/0066218 A1 | 3/2005 | Stachura et al. | |
| 2005/0198196 A1 | 9/2005 | Bohn et al. | |
| 2006/0004806 A1 | 1/2006 | Kraft | |
| 2006/0031188 A1 | 2/2006 | Lara et al. | |

(Continued)

*Primary Examiner* — Ario Etienne
*Assistant Examiner* — Michael C Lai
(74) *Attorney, Agent, or Firm* — Lowenstein Sandler LLP

(57) ABSTRACT

Embodiments relate to systems and methods for remote network configuration management having multi-node awareness. A management server can communicate with a set of hosts in a network, each of which can have associated target machines such as computer clients. The configuration details of the set of hosts can be stored in a set of configuration files. The configuration files can specify, for example, processor, memory, hardware, I/O, and other resources of the hosts or targets associated with the hosts. When a systems administrator or other user wishes to push an updated configuration or send new data to the set of hosts, the management server can identify versions of software and other resources to transmit and install to hosts in the set of hosts based on their particular configuration details reflected in the corresponding configuration files(s), without having to manually identify versions to be distributed to individual hosts or resolve dependencies.

14 Claims, 4 Drawing Sheets

(56) References Cited

U.S. PATENT DOCUMENTS

| | | |
|---|---|---|
| 2006/0050862 A1* | 3/2006 | Shen et al. .................... 379/219 |
| 2006/0075294 A1 | 4/2006 | Ma et al. |
| 2006/0161444 A1 | 7/2006 | Lubrecht et al. |
| 2007/0005661 A1 | 1/2007 | Yang |
| 2007/0027936 A1 | 2/2007 | Stakutis et al. |
| 2007/0038679 A1* | 2/2007 | Ramkumar et al. .......... 707/200 |
| 2007/0074077 A1 | 3/2007 | Markow et al. |
| 2007/0121527 A1* | 5/2007 | Zhou et al. .................... 370/254 |
| 2007/0266124 A1* | 11/2007 | Kinyon et al. ................ 709/221 |
| 2007/0288530 A1 | 12/2007 | Romem et al. |
| 2008/0016186 A1 | 1/2008 | Ball |
| 2008/0091466 A1 | 4/2008 | Butler et al. |
| 2008/0209033 A1* | 8/2008 | Ginter et al. ................. 709/224 |
| 2008/0219563 A1* | 9/2008 | Moroney ...................... 382/224 |
| 2008/0244047 A1 | 10/2008 | Yeung et al. |
| 2009/0070442 A1 | 3/2009 | Kacin et al. |
| 2009/0132698 A1 | 5/2009 | Barnhill, Jr. |
| 2009/0193413 A1 | 7/2009 | Lee |
| 2009/0276620 A1 | 11/2009 | McCarron et al. |
| 2009/0276772 A1 | 11/2009 | Garrett et al. |
| 2009/0300180 A1* | 12/2009 | Dehaan et al. ................ 709/225 |
| 2010/0077076 A1 | 3/2010 | Wada |
| 2010/0088197 A1 | 4/2010 | DeHaan |
| 2010/0185590 A1 | 7/2010 | D'Angelo et al. |
| 2010/0198964 A1 | 8/2010 | Tanaka |
| 2010/0218014 A1 | 8/2010 | Bozek et al. |
| 2010/0223274 A1 | 9/2010 | DeHaan et al. |
| 2010/0223375 A1 | 9/2010 | DeHaan |
| 2010/0275064 A1 | 10/2010 | DeCusatis et al. |
| 2010/0306334 A1 | 12/2010 | DeHaan |
| 2010/0306347 A1 | 12/2010 | DeHaan |
| 2010/0306359 A1 | 12/2010 | DeHaan |
| 2011/0047414 A1 | 2/2011 | Kudo et al. |
| 2011/0055361 A1 | 3/2011 | DeHaan |
| 2011/0055636 A1 | 3/2011 | DeHaan |
| 2011/0055669 A1 | 3/2011 | DeHaan |
| 2011/0055810 A1 | 3/2011 | DeHaan |
| 2011/0078301 A1 | 3/2011 | DeHaan |
| 2011/0107299 A1 | 5/2011 | DeHaan |

* cited by examiner

REMOTE NETWORK MANAGEMENT HAVING MULTI-NODE AWARENESS

FIELD

The present teachings relate to systems and methods for network management having multi-node awareness, and more particularly to platforms and techniques for generating configuration updates for a set of hosts adapted to the particular configurations of individual hosts from a central management server, based on configuration records or templates.

BACKGROUND OF RELATED ART

Remote management platforms exist in which a network administrator can update or modify the local configuration of the host or its associated target machines, such as client computers. In general, configuration updates on known platforms can generally take place using one of two techniques. In existing pull methods, software daemon(s) on the remote machine can check in with a central management server to see if there are any outstanding orders. In existing push methods, the administrator can push orders down to the various daemon (s). In either case, affected machines communicate with a central management server in one direction or the other. The advantage of the push case is that technique is instantaneous, whereas a pull event may only happen once every certain period of time. Multi-node configuration management can therefore benefit from a push system, but similar management could be done on a pull basis, although with slower execution since various steps on different systems are not able to follow immediately after one another.

While platforms of these types can manage the configuration settings of hosts and their associated targets, the updating or management action takes place on a host-by-host basis. Conventional configuration logic as a result is not capable of determining the dependencies necessary for performing an installation or update for applications which span multiple systems. An example is a Web application. Suppose the database for a Web application resides on one machine, while an authentication server resides on another machine, while an associated cost accounting engine resides on a third machine. To install this application one would have to perform actions on all of these machines in a particular order. Existing configuration management systems (such as, e.g., puppet or cfengine) are generally pull based, and are only capable of operating on a specific machine. Those and other existing platforms do not contain the ability to resolve dependencies, and direct one machine to do action X after another machine successfully completes action Y. In conventional platforms, a given host therefore is in general not capable of initiating a configuration update of applications which span multiple other hosts. It may be desirable to provide methods and systems for the remote network management in which a management platform is equipped to automatically generate configuration installations and/or updates, incorporating dependencies and other configuration details.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
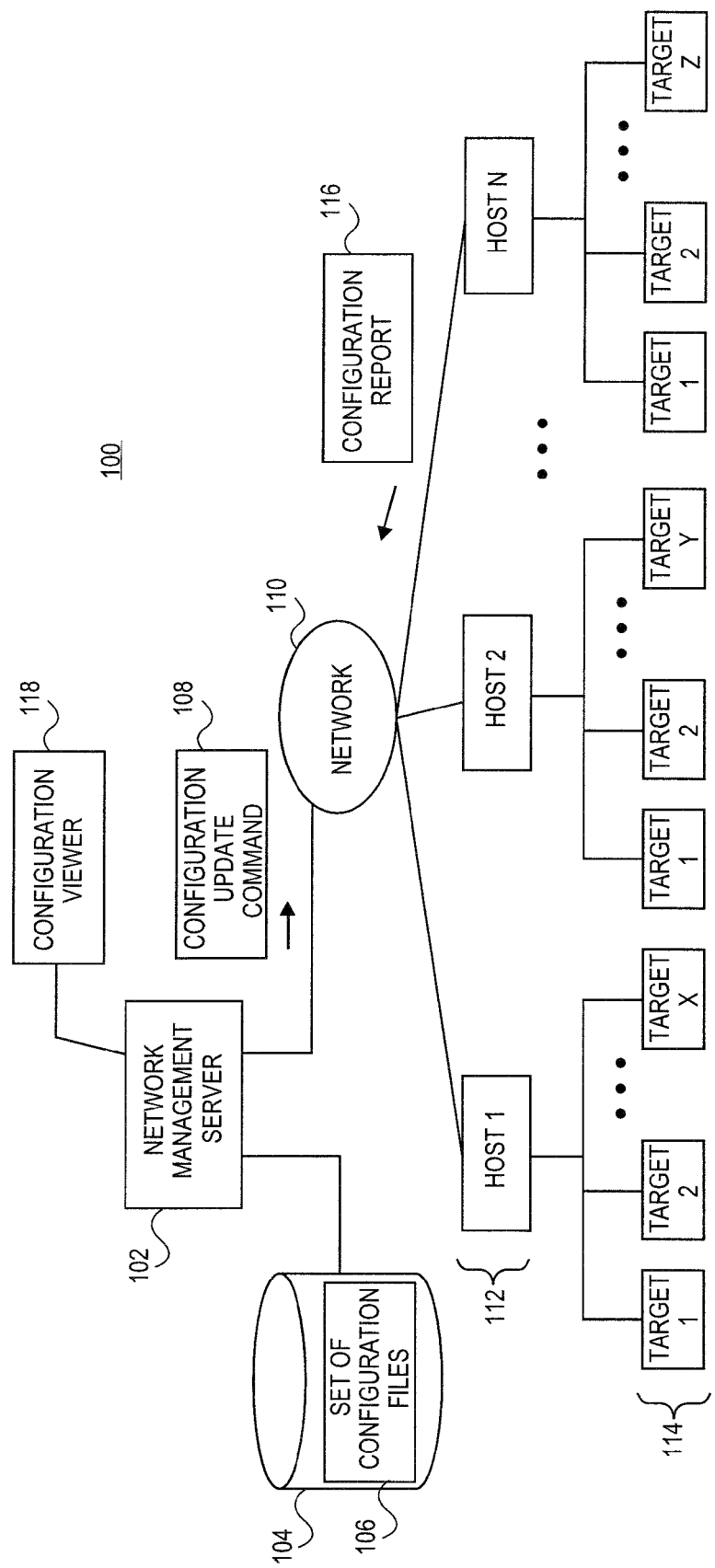
FIG. 1 illustrates an overall system for remote network management having multi-node awareness, according to various embodiments.

Embodiments of the present teachings relate to systems and methods for remote network management having multi-node awareness. More particularly, embodiments relate to platforms and techniques that centrally monitor and manage the installation, configuration, and/or updating process for a set of hosts and their associated targets on a differentiated basis. A management server can access or maintain a set of configuration templates that record configuration data for individual hosts in a set of hosts, and/or the configuration data for target machines associated with each host. A configuration update can for instance be initiated at the management server based on a request, at predetermined times, or based on predetermined network conditions. The management server can access the configuration template for one or more hosts and/or targets in the set of hosts, and adapt a set of configuration data for each host and/or targets based on the configuration details or specifications for each intended recipient of the configuration update. For example, a first host can be scheduled to receive a version update to a Linux™ operating system installation, while a second host can be scheduled to receive a version update to a Unix™ operation system installation. In embodiments, the configuration process can be initiated on the management server side without a need to specify the individual operating system types or versions, since configuration data including operating system, application, hardware, and network resources can be identified in the corresponding configuration template for the recipient host/target(s). The management server can read the configuration template data for each recipient, and for example a data store to extract different versions of software to transmit to the recipient host/target. In embodiments, the management server can in addition or instead transmit configuration commands to the recipient host/target to alter the configuration settings of existing hardware or software resources on the recipient device. In embodiments, the management server can determine a sequence in which to transmit the configuration update data to the host/target(s), for instance to account for dependencies in the configuration process between different machines. The management server can thereby resolve ordered dependencies between systems and construct ways to control the application of the configuration change such that if affects multiple systems in the correct order.

According to embodiments in one regard, configuration updates can be initiated and managed from a central platform on a global basis, without a need to repetitively conduct individual updates on a host-by-host basis. Systems and methods according to the present teachings permit a systems administrator or other user to describe and execute configuration changes that require execution on multiple host, servers, or other machines in a particular order, unlike for instance known platforms which can only configure one server or other machine, and can not process multiple-server applications. These and other embodiments described herein can provide a systems administrator or other user with enhanced flexibility in the management of network configurations, permitting, among other things, the ability to keep a population of network hosts/targets in a desired configuration using comparatively compact command structures.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall system 100 consistent with systems and methods for remote network management having multi-node awareness, according to various embodiments of the present teachings. In embodiments as shown, a network management server 102 can communicate with a set of hosts 112 as well as a set of targets 114 associated with hosts in the set of hosts, via one or more networks 110. One or more networks 110 can be or include the Internet, or other public or private networks. One or more networks 110 can be or include wired, wireless, optical, and other network connections. Set of hosts 112 can be or include a set of servers hosting or supporting a local area network, or other network(s). Set of targets 114 can be or include a set of personal computers, network-enabled media devices, or other clients, devices, or machines.

Network management server 102 can include or access resources to support configuration processing related to set of hosts 112 and/or set of targets 114, including a configuration store 104. Configuration store 104 can be or include a database or other data store, and in embodiments can store a set of configuration files 106. Set of configuration files 106 can record information related to the configuration of individual hosts in set of hosts 112 as well as information related to the configuration of targets in set of targets 114, as well as other data. Network management server 102 can also include, access, or communicate with a configuration viewer 118 to permit a systems administrator or other user to view information related to the set of hosts 112 and/or set of targets 114 that are monitored and managed via network management server 102. In embodiments configuration viewer 118 can be a browser, or other application or software.

According to embodiments in one regard, network management server 102 can maintain and access set of configuration files 106 to carry out configuration updates and other modifications on set of hosts 112, set of targets 114, and/or other hardware under management in the network. Network management server 102 can effect changes to the configuration of the set of targets 114, for instance, by transmitting a configuration update command 108 or other order to the target machine(s) or device(s). According to embodiments, configuration update command 108 can contain instructions, command, script, or other information to cause a configuration of one or more hosts and/or targets to be updated or modified. Configuration update command 108 can contain instructions, for example, to cause an intended recipient to change a processor configuration, a memory configuration, a storage configuration, a security configuration, a network or input/output (I/O) configuration, or other configurations or settings of hardware, software, or other resources. In embodiments, configuration update command 108 can contain or direct the installation of selected operating system or other software. In embodiments, the configuration update command 108 can be transmitted to a machine or machines of interest based on an Internet protocol (IP) address. In embodiments, the configuration update command 108 and other data can be transmitted to set of hosts 112 and/or set of targets 114 via one or more secure channels, such as the secure channel and related resources described in co-pending U.S. application Ser. No. 12/130,424, filed May 30, 2008, entitled "Systems and Methods for Remote Management of Networked Systems Using Secure Modular Platform," which published as U.S. Patent Application Publication No. 20090300180, assigned or under obligation of assignment to the same entity as this application, and which application is incorporated by reference herein.

According to embodiments of the present teachings in one regard, the specification of configuration updates in one or more configuration update command 108 can be tailored or customized for the configurations of individual machines or devices in set of hosts 112 and/or set of targets 114. Hosts or targets running a specified version of an operating system can, for example, receive configuration instructions consistent with that version of the operating system, while hosts or targets running a different version or type of operating system can receive configuration instructions consistent with that separate operating system. According to embodiments in one regard, a systems administrator or other user need not be aware of all types of configurations of the underlying hosts or targets to generate configuration update command 108. The systems administrator or other user can instead initiate multi-node update events based on global commands, which network management server 102 can differentiate into specific sets or version of configuration update command 108 by accessing set of configuration files 106. According to various embodiments, network management server 102 can obtain or update the configurations recorded in set of configuration files 106 by interrogating set of hosts 112 and/or set of targets 114, for instance via periodic or other queries transmitted to those devices via one or more networks 110. According to embodiments, network management server 102 can also generate updated versions of set of configuration files 106 and store those versions to configuration store 104 after completion of every configuration update event or process, or at other times.

Figure 2:
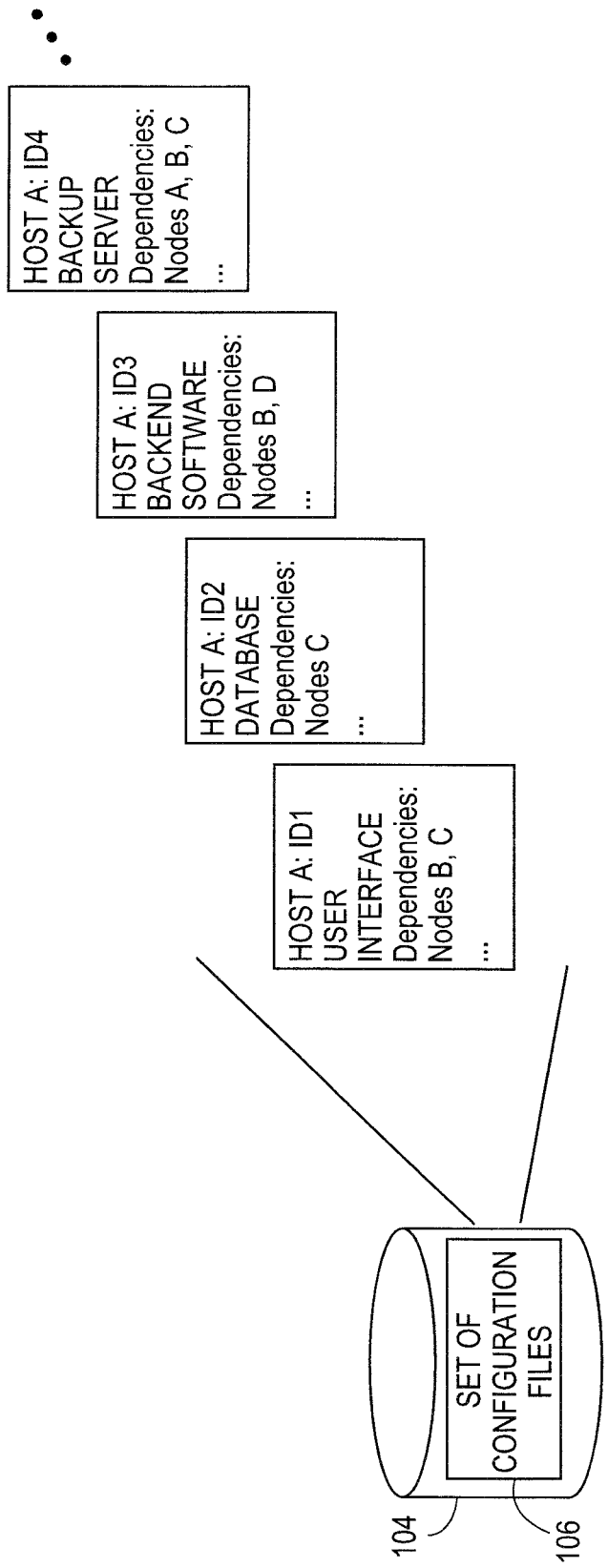
FIG. 2 illustrates an exemplary a set of configuration templates that can be used in systems and methods for remote network management having multi-node awareness, according to various embodiments.

FIG. 2 illustrates illustrative records that can be stored in set of configuration files 106, according to various embodiments. In illustrative embodiments as shown, user interface logic of A Web application or other software can reside on machine A, a database resides on machine B, and backend software resides on machine C, while machine D is configured to be a backup server. In embodiments as shown, each record or template in set of configuration files 106 can store information related to host ID, number of associated targets, operating system type and version, installed applications, or configuration data related to other hardware, software, network, and/or other resources of set of hosts 112 and/or set of targets. Software configurations of the set of targets 114 supported by a given host can for example be stored in set of configuration files 106, as shown. A list or other record of dependencies for the installation, configuration, and/or updating of the affected machines can be incorporated in set of configuration files 106, as shown. Other types and configurations of data records and stores can be used.

Figure 3:
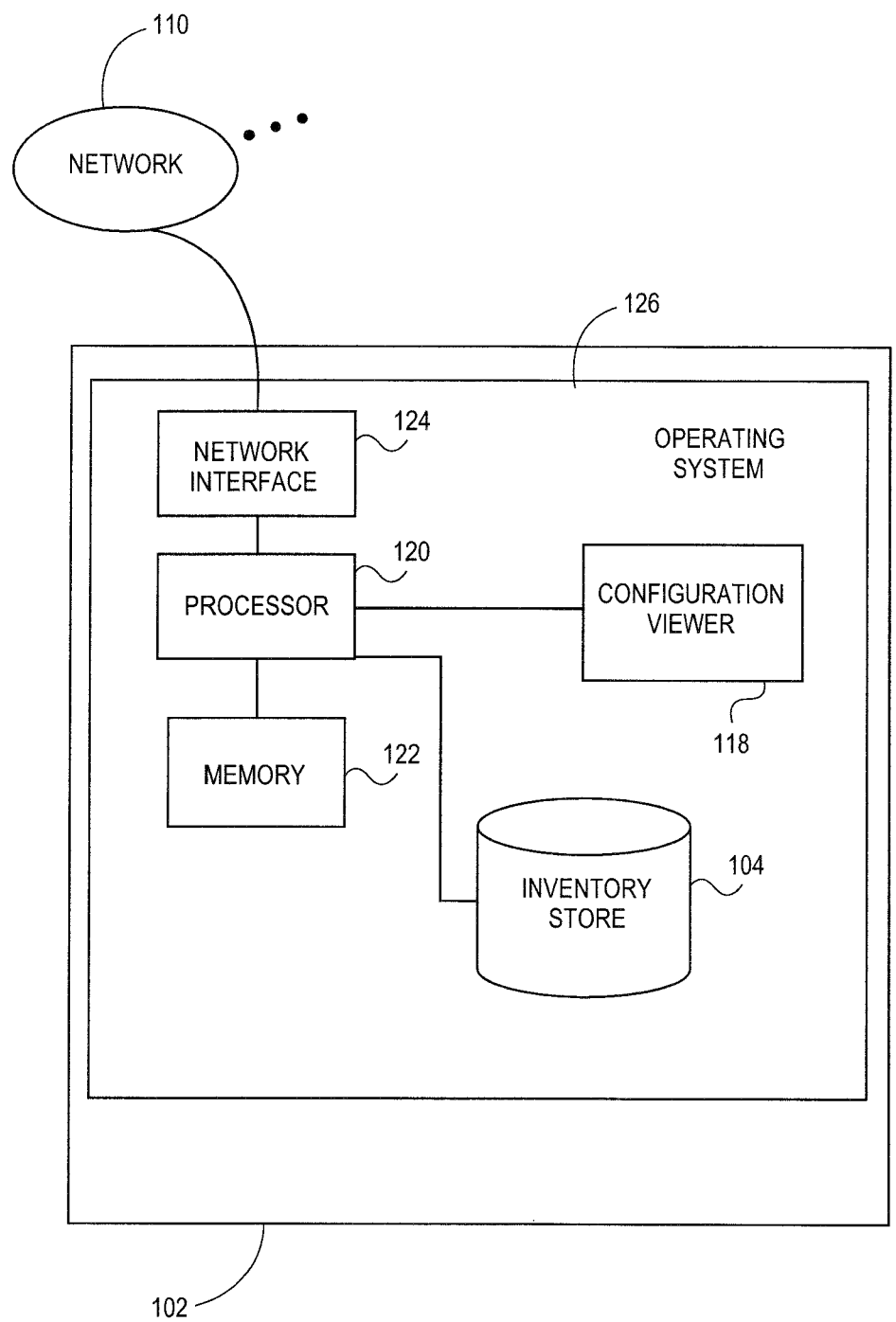
FIG. 3 illustrates an exemplary hardware configuration of a network management server, according to various embodiments.

FIG. 3 illustrates an exemplary diagram of hardware and other resources that can be incorporated in a network management system 102 configured to communicate with set of hosts 112 and/or set of targets 114 via one or more networks 110, according to embodiments. In embodiments as shown, network management system 102 can comprise a processor 120 communicating with memory 122, such as electronic random access memory, operating under control of or in conjunction with operating system 126. Operating system 126 can be, for example, a distribution of the Linux™ operating system, the Unix™ operating system, or other open-source or proprietary operating system or platform. Processor 120 also communicates with configuration store 104, such as a database stored on a local hard drive. Processor 120 further communicates with network interface 124, such as an Ethernet or wireless data connection, which in turn communicates with one or more networks 110, such as the Internet or other public or private networks. Processor 120 also communicates with configuration viewer 118, such as a Web browser or other application, to permit a user to view and execute control logic and control configuration operations in set of hosts 112 and/or set of targets 114. Other configurations of network management system 102, associated network connections, and other hardware and software resources are possible.

Figure 4:
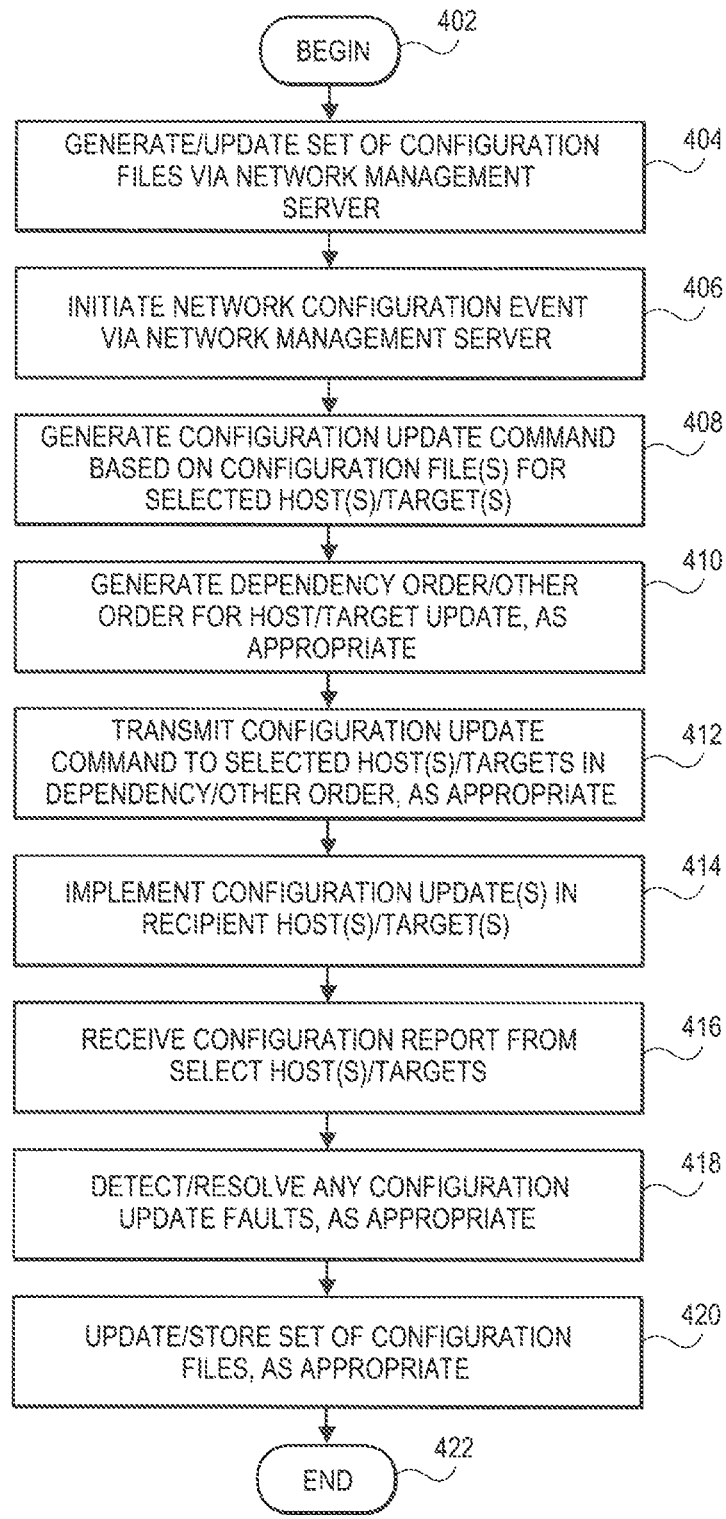
FIG. 4 illustrates a flowchart of overall remote network management processing including multi-node awareness, according to various embodiments.

FIG. 4 illustrates a flow diagram of overall processing for remote network management having multi-node awareness, according to various embodiments. In 402, processing can begin. In 404, a set of configuration files 106 can be generated and/or updated via the management server 102. The set of configuration files 106 can for example be accessed from and/or stored to configuration store 104 or other data stores. In 406, a network configuration event including configuration update processing can be initiated via network management server 102, for example by communicating with a set of hosts 112 via one or more networks 110.

In 408, the network management server 102 can generate a dependency order for the one or more configuration update command 108 to be transmitted to the selected host(s) and/or target(s). In 408, network management server 102 can generate one or more configuration update command 108 based on the configuration template(s) for the selected host(s) and/or target(s). For example, network configuration changes that depend on or affect changes to security settings can be scheduled or staggered to take place in appropriate order. Other types of dependencies, sequences, or orders can be used. In embodiments, configuration orders contained in the one or more configuration update command 108 can reflect user-supplied input, such as instructions for installing or updating a multi-node application on multiple servers or hosts, or a description of all software to be installed on a network. In 410, the one or more configuration update command 108 can be transmitted to the selected host(s) and/or target(s) via one or more networks 110. In embodiments, the one or more configuration update command 108 can be transmitted in dependency order or other scheduled sequence, as appropriate. In embodiments, one or more configuration update command 108 can be transmitted or "pushed" at predetermined times or on predetermined schedules. In embodiments, transmission of one or more configuration update command 108 can be initiated by a systems administrator or other user. In embodiments, the transmission of one or more configuration update command 108 can be initiated based on predetermined network events, such as receipt of notification of a hardware change to set of host(s) 112 and/or set of targets 114, the occurrence of an application fault or detection of a virus or other malicious software, or based on other conditions or events.

In 412, the recipient host(s) and/or target(s) can receive and carry out the configuration updates specified in the configuration update command. In 414, network management server 102 can in embodiments receive a configuration report 116 from the updated host(s)/target(s) and/or other machines. In 416, network management server 102 can detect and/or resolve any configuration update faults or other identified conditions, for instance based on configuration report 116 and/or other data. In 418, network management server 102 can update and/or store the set of configuration files 106 to configuration store 104 or other storage, a appropriate. In 420, as understood by persons skilled in the art, processing can processing can repeat, return to a prior processing point, jump to a further processing point, or end.

The foregoing description is illustrative, and variations in configuration and implementation may occur to persons skilled in the art. For example, while embodiments have been described in which a single network management server 102 communicates with a set of hosts 112 and associated set of targets 114, in embodiments multiple management servers, databases, or other platforms can cooperate to manage the configuration update process for one or more networks. For further example, while embodiments have been described in which configuration data for set of hosts 112 and associated set of targets 114 are maintained in a single set of configuration files 106, in embodiments, other types, quantities, or arrangements can be used to record configuration data. For instance, multiple sets of configuration templates can be stored to one or more databases.

For further instance, network management server 102 can also or instead interrogate set of hosts 112 and/or associated set of associated targets 114 for some or all configuration data related to a configuration update process. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
accessing, by a management server, a set of configuration data specifying a plurality of configurations for a set of nodes in a network remote to the management server, wherein the plurality of configurations comprises first configuration data for a first node of the set of nodes and second configuration data for a second node of the set of nodes;
generating, by the management server and in view of a received global command, a set of configuration orders comprising a first configuration order in view of the first configuration data to be transmitted to the first node and a second configuration order in view of the second configuration data to be transmitted to the second node;
determining, by the management server and in view of a configuration dependency between the first node and the second node, a sequence in which to transmit the first configuration order and the second configuration order;
transmitting, in view of the sequence and in view of at least one of a predetermined schedule or a predetermined triggering event, the first configuration order to the first node; and
in view of a determination that the first configuration order has been transmitted to the first node, transmitting the second configuration order to the second node.

2. The method of claim 1, wherein the first configuration data comprises a node template specifying at least one of hardware resources, software resources, or network settings for the first node.

3. The method of claim 1, wherein the first configuration order comprises at least one of a software installation order, a software update order, a software inventory order, a hardware inventory order, a security order, or a node restore order.

4. The method of claim 1, wherein the set of nodes comprises a set of hosts and a set of targets associated with the set of hosts.

5. The method of claim 1, wherein the first and the second configuration orders are different.

6. A system, comprising:
an interface to a set of nodes in a network; and
a processor to communicate with the set of nodes via the interface and to:
  access a set of configuration data specifying a plurality of configurations for the set of nodes, wherein the plurality of configurations comprises first configuration data for a first node of the set of nodes and second configuration data for a second node of the set of nodes;
  generate, in view of a received global command, a set of configuration orders comprising a first configuration order in view of the first configuration data to be transmitted to the first node and a second configuration order in view of the second configuration data to be transmitted to the second node;
  determine, in view of a configuration dependency between the first node and the second node, a sequence in which to transmit the first configuration order and the second configuration order
  transmit, in view of the sequence and in view of at least one of a predetermined schedule or a predetermined triggering event, the first configuration order to the first node; and
  in view of a determination that the first configuration order has been transmitted to the first node, transmit the second configuration order to the second node.

7. The system of claim 6, wherein the first configuration data comprises a node template that specifies at least one of hardware resources, software resources, or network settings for the first node.

8. The system of claim 6, wherein the first configuration order comprises at least one of a software installation order, a software update order, a software inventory order, a hardware inventory order, a security order, or a node restore order.

9. The system of claim 6, wherein the processor is further to store updated configuration data to a data store.

10. The system of claim 6, wherein the set of nodes comprises a set of hosts and a set of targets associated with the set of hosts.

11. The system of claim 6, wherein the first and the second configuration orders are different.

12. A non-transitory computer readable medium comprising instructions executable by a processor to perform operations comprising:
  accessing, by a management server, a set of configuration data specifying a plurality of configurations for a set of nodes in a network remote to the management server, wherein the plurality of configurations comprises first configuration data for a first node of the set of nodes and second configuration data for a second node of the set of nodes;
  generating, by the management server and in view of a received global command, a set of configuration orders comprising a first configuration order in view of the first configuration data to be transmitted to the first node and a second configuration order in view of the second configuration data to be transmitted to the second node;
  determining, by the management server and in view of a configuration dependency between the first node and the second node, a sequence in which to transmit the first configuration order and the second configuration order;
  transmitting, in view of the sequence and in view of at least one of a predetermined schedule or a predetermined triggering event, the first configuration order to the first node; and
  in view of a determination that the first configuration order has been transmitted to the first node, transmitting the second configuration order to the second node.

13. The non-transitory computer readable medium of claim 12, wherein the first configuration data comprises a node template specifying at least one of hardware resources, software resources, or network settings for the first node.

14. The non-transitory computer readable medium of claim 12, wherein the first configuration order comprises at least one of a software installation order, a software update order, a software inventory order, a hardware inventory order, a security order, or a node restore order.

* * * * *